United States Patent
Kircher et al.

(10) Patent No.: US 11,999,484 B2
(45) Date of Patent: Jun. 4, 2024

(54) MOVABLE OXYGEN CONTAINER, AND MONUMENT, PASSENGER VEHICLE SECTION AND VEHICLE HAVING THE SAME

(71) Applicant: Airbus Operations GmbH, Hamburg (DE)

(72) Inventors: Benedikt Kircher, Hamburg (DE); Matthias Heringslack, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 4 days.

(21) Appl. No.: 17/879,148

(22) Filed: Aug. 2, 2022

(65) Prior Publication Data
US 2023/0066684 A1   Mar. 2, 2023

(30) Foreign Application Priority Data
Aug. 24, 2021 (EP) .................................. 21192779

(51) Int. Cl.
*B64D 11/00*   (2006.01)

(52) U.S. Cl.
CPC ........ *B64D 11/00* (2013.01); *B64D 2231/025* (2013.01)

(58) Field of Classification Search
CPC .......................... B64D 11/00; B64D 2231/025
See application file for complete search history.

(56) References Cited

U.S. PATENT DOCUMENTS

| | | | |
|---|---|---|---|
| 4,154,237 A * | 5/1979 | Courter .................. | B64D 11/00 244/118.6 |
| 6,089,230 A * | 7/2000 | Barker ..................... | A62B 7/14 128/202.26 |
| 6,454,209 B1 | 9/2002 | Bock et al. | |
| 8,950,402 B2 | 2/2015 | Schneider et al. | |
| 2005/0263156 A1* | 12/2005 | Westphal ............... | B64D 25/00 128/205.13 |
| 2011/0062744 A1 | 3/2011 | Schrader et al. | |
| 2012/0205491 A1* | 8/2012 | Rittner .................. | B64D 11/00 244/118.5 |

(Continued)

FOREIGN PATENT DOCUMENTS

| CN | 104736434 A | 6/2015 |
|---|---|---|
| CN | 110960115 A * | 4/2020 |

(Continued)

OTHER PUBLICATIONS

European Search Report; priority document, dated Sep. 12, 2022.

*Primary Examiner* — Valentina Xavier
(74) *Attorney, Agent, or Firm* — Greer, Burns & Crain, Ltd.

(57) ABSTRACT

An oxygen container for a passenger transport vehicle with a compartment configured to hold at least one oxygen mask, a moving mount coupled to the compartment and configured to linearly or pivotally move the compartment from a stowed position to a release position, and a bottom lid hinged to the compartment and configured to move to an open position and releasing the at least one oxygen mask, when the compartment moves from the stowed position to the release position. Also provided are a monument and a passenger vehicle section, as well as an aircraft having such an oxygen container.

17 Claims, 5 Drawing Sheets

(56) References Cited

U.S. PATENT DOCUMENTS

| | | | |
|---|---|---|---|
| 2012/0325217 A1* | 12/2012 | Lang | B64D 11/00 |
| | | | 128/205.25 |
| 2013/0074836 A1* | 3/2013 | Contino | A62B 7/08 |
| | | | 128/205.25 |
| 2015/0158588 A1 | 6/2015 | Moje et al. | |
| 2015/0251762 A1 | 9/2015 | Ehlers et al. | |
| 2018/0038145 A1* | 2/2018 | Bleier | E05D 15/582 |
| 2018/0273179 A1 | 9/2018 | Suarato | |
| 2019/0061949 A1* | 2/2019 | Potet | B64D 10/00 |
| 2019/0308728 A1 | 10/2019 | McKee | |

FOREIGN PATENT DOCUMENTS

| | | | | |
|---|---|---|---|---|
| EP | 1281575 A2 | 2/2003 | | |
| EP | 2883793 A2 | 6/2015 | | |
| GB | 2111837 A | 7/1983 | | |
| WO | WO-2009150223 A1 * | 12/2009 | | B64D 13/00 |
| WO | 2016049064 A1 | 3/2016 | | |
| WO | 2017055888 A1 | 4/2017 | | |

* cited by examiner

MOVABLE OXYGEN CONTAINER, AND MONUMENT, PASSENGER VEHICLE SECTION AND VEHICLE HAVING THE SAME

CROSS-REFERENCES TO RELATED APPLICATIONS

This application claims the benefit of the European patent application No. 21192779.3 filed on Aug. 24, 2021, the entire disclosures of which are incorporated herein by way of reference.

FIELD OF THE INVENTION

The invention relates to an oxygen container having a compartment to hold at least one oxygen mask, a monument and passenger vehicle section as well as an aircraft comprising such oxygen container. Particularly, the invention relates to an oxygen container having a movable compartment to hold at least one oxygen mask, and further relates to a monument, passenger vehicle section and aircraft having such oxygen container that can be moved, for example, into an aisle next to the monument.

BACKGROUND OF THE INVENTION

Aircraft are usually equipped with oxygen masks for passengers and flight attendants, which can be used in case of a pressure drop in the passenger cabin, particularly during emergency cases. Such oxygen masks are stored in an associated oxygen container, also referred to as an O2-box. If needed, a flap of the oxygen container opens, so that the oxygen masks can fall out and can be used.

Thus, the oxygen containers are usually installed in a ceiling area of the aircraft and/or above a seating area. This, however, requires the ceiling area or a component above the seating area to have a particular design integrating the oxygen container.

It is therefore an object of the invention to provide an oxygen container, monument, passenger vehicle section and aircraft that provides flexibility for the design of interior aircraft components.

SUMMARY OF THE INVENTION

According to a first exemplary aspect to better understand the present disclosure, an oxygen container for a passenger transport vehicle comprises a compartment configured to hold at least one oxygen mask, a moving mount coupled to the compartment and configured to move the compartment from a stowed position to a release position, and a bottom lid hinged to the compartment and configured to move to an open position and releasing the at least one oxygen mask, when the compartment moves from the stowed position to the release position. An oxygen container is to be understood as a box or similar structure providing an interior space sized to receive and hold at least one oxygen mask. The number of oxygen masks depends on the number of passengers or flight attendants to be supplied with oxygen and such masks.

In this oxygen container, the oxygen masks are stored in a compartment that is arranged in different areas or regions when in a stowed position and in a release position. Thus, the oxygen container can be installed in or at a component that is not placed at a space where the oxygen container is in the release position, i.e., the position where the oxygen masks fall out of the compartment and can be used by passengers and/or flight attendants. Thus, this new design for an oxygen container allows other components to be designed differently, particularly components directly above the seating area for passengers or flight attendants and/or above a working area of flight attendants.

In an implementation variant, the moving mount can be a slide configured to linearly move the compartment from the stowed position to the release position. In other words, the compartment moves from the stowed position to the release position like a drawer. This movement brings the bottom lid into a region, where the space underneath the bottom lid in the release position is free, so that the bottom lid can freely open and the oxygen masks can fall into the free space. For instance, the moving mount can be a roller slide, a telescopic slide or any other linear-motion bearing. The linear motion allows movement of the compartment about a distance sufficient to reach the release position.

Alternatively, the moving mount can be a swivel configured to pivotally move the compartment from the stowed position to the release position. For instance, the swivel can include a shaft and a rotary bearing, one of which is connected to the compartment allowing it to rotate around an axis. The swivel can also comprise a shaft and a concentric cylinder put over the shaft and connected to the compartment, to achieve a pivotal movement of the compartment with respect to the shaft.

Further alternatively, the moving mount can include a slide and a swivel configured to linearly and pivotally move the compartment. For instance, after the pivotal movement of the compartment beginning at the estate position, the compartment may be linearly moved, to reach the final release position. Of course, both movements can take place at the same time.

The pivotal movement of the compartment turns the compartment around an axis of rotation, so that the compartment reaches a different position from the stowed position. For instance, the compartment may move about 30°, 45°, 90°, 180° or even up to 270° or any value between a minimum angle to open the bottom lid (e.g., 20°) to a maximum angle (e.g., 300°). A turning angle of 90° to 270° allows the largest displacement of the compartment between stowed position and release position, which will have the greatest effect on the flexibility and freedom for the design of the interior of the aircraft.

In another implementation variant, an axis of rotation of the swivel can be located at one end of the compartment. In other words, the axis of rotation is at a lateral end of the compartment or even further away, for example due to an extension of the swivel and/or a lever arm arranged between swivel and compartment. This achieves a large displacement of the compartment between stowed position and release position, so that the oxygen masks can be placed optimally with respect to a seating area or working area.

Alternatively, an axis of rotation of the swivel can run through the compartment dividing the compartment in two portions. In other words, the two portions of the compartment are both displaced, when moved from the stowed position to the release position, on opposite sides of the axis of rotation. This arrangement allows provision of an oxygen container that can be easily integrated into other components, since the size of the moving parts of the oxygen container are smaller and the loads thereof are more balanced.

Furthermore, the bottom lid can exemplarily cover a space of the compartment corresponding to one of the two portions. Thus, the oxygen masks may be stored in the space of the compartment covered by the bottom lid, while the other of the two portions can be used differently, e.g., for installation of an oxygen tank or oxygen generator. For instance, the axis of rotation may divide the compartment in two differently sized portions, wherein one is dimensioned to receive and hold the required number of oxygen masks.

In a further implementation variant, the compartment can have a round end face at a side distant from the swivel, wherein the round end face has a circular curvature with a center of radius at the rotation axis of the swivel. In other words, a radial end of the compartment has a curved or round end, wherein the end wall or end face of the compartment has a circular shape with a radius corresponding to the distance between the rotation axis of the swivel and the length of the compartment. This allows a pivotal movement of the compartment without intervening with any surrounding component. In addition, any gap between the compartment and an adjacent component can be sized to a minimum tolerance, so that the oxygen container can be integrated in a neat fashion into adjacent components.

In another implementation variant, the oxygen container can further comprise a first actuator configured to act on the compartment and/or the moving mount for moving the compartment from the stowed position to the release position. The first actuator can apply a force, which linearly and/or pivotally moves the compartment. For example, the first actuator can be a spring, a motor or a hydraulic or pneumatic piston. Furthermore, the first actuator can include two elements achieving respective movements, such as one element providing the pivotal movement of the compartment and one element providing the linear movement of the compartment.

In a further implementation variant, the oxygen container can further comprise a second actuator configured to act on the compartment and/or the bottom lid for moving the bottom lid to the open position. Thus, the second actuator can apply a force acting between the bottom lid and the compartment, for example, to move the bottom lid away from the compartment. For instance, the second actuator can be a spring, a motor or a hydraulic or pneumatic piston. Alternatively, the bottom lid opens freely due to the gravitational force acting thereon and on the stored oxygen masks lying on the bottom lid inside the compartment before falling out.

In another implementation variant, the oxygen container can further comprise a compartment release assembly configured to release the compartment from the stowed position, when the bottom lid moves to the open position. For example, the bottom lid may be hold or locked in a closed position, for example by a latch or the like. This holding or locking can be released, for example triggered in case of an emergency or pressure drop, so that the bottom lid is free to move (actively or inactively) towards the open position. This movement of the bottom lid can be employed to trigger the compartment release assembly releasing the moving mount from the stowed position, so that the compartment can reach the release position.

Thus, a legacy mechanism to open the compartment (i.e., the O2 box) can be used to open the bottom lid. The compartment release assembly provides for release of the moving mount triggered by the legacy mechanism to open the compartment. Therefore, the costs for installation of the oxygen container are low.

In an associated implementation variant, the compartment release assembly can comprise a first rocker arranged to be contacted by the bottom lid at a first end of the first rocker, when the bottom lid moves to the open position. The compartment release assembly can further comprise a second rocker coupled to a second end of the first rocker opposite to the first end and configured to release the compartment from the stowed position. The second rocker may be coupled to the first rocker at a first end of the second rocker, while an opposite second end of the second rocker is movably or elastically supported. Once the bottom lid opens, the first rocker is moved by the bottom lid, and the second rocker is moved by the first rocker. The second end of the second rocker performs a movement depending on the length (lever) of the first and second rocker, and can be used to trigger the release of the moving mount. Thus, the second rocker, and particularly its second end, can function as a latch holding the compartment in the stowed position. Once moved, the second end of the second rocker (i.e., the latch) frees the moving mount, which then can move the compartment to the release position.

In yet another implementation variant, the oxygen container can further comprise a lid release assembly configured to hold the bottom lid in a closed position, when the compartment is in the stowed position, and to release the bottom lid towards the open position, when the compartment moves to the release position. For example, the lid release assembly may be configured to contact the bottom lid and hold it in the closed position on an exterior side of the bottom lid, i.e., opposite to the compartment storage space, when the compartment is in the stowed position. Once the compartment starts moving towards the release position, the lid release assembly glides or slides along the bottom lid. At the latest when the bottom lid leaves the lid release assembly, the bottom lid is free to open and move into its open position.

Optionally, the bottom lid can move towards its open position, while still in contact with the lid release assembly. For example, the lid release assembly may be elastically supported, wherein a force acting from the lid release assembly onto the bottom lid is set large enough to initially hold the bottom lid in the closed position. Due to the moving of the compartment and, hence, the bottom lid towards the release position, a lever defined between the hinge of the bottom lid and the contact point of the lid release assembly decreases. This will lead to the situation that the force acting on the bottom lid to open the bottom lid will become larger than the elastic force holding the lid release assembly against the bottom lid, so that the bottom lid will move the elastically supported lid release assembly away from its original position, so that the bottom lid can open even further.

Alternatively, the lid release assembly can be actively moved, thereby freeing the bottom lid from the closed position. For instance, the lid release assembly or an element thereof contacting and holding the bottom lid can be actively moved away from the bottom lid.

In an associated implementation variant, the lid release assembly can comprise a first rocker contacting the bottom lid at a first end of the first rocker and holding the bottom lid in the closed position, and a second rocker coupled to a second end of the first rocker opposite to the first end and configured to support the first rocker when holding the bottom lid. The second rocker may be coupled to the first rocker at a first end of the second rocker, while an opposite second end of the second rocker is movably or elastically supported. The first and second rocker may be dimensioned to provide a large enough lever holding the bottom lid in the closed position, when the compartment is in the stowed position. As with the elastically supported lid release assembly, the moving of the compartment and bottom lid towards the release position comes with a decreasing lever between a contacting point of the first rocker and the bottom lid with respect to the hinge of the bottom lid. This allows the bottom lid to move the first rocker and the coupled second rocker against the support of the second rocker.

Alternatively, the second rocker can actively be moved, thereby freeing the bottom lid at the first end of the first rocker. For instance, the second rocker can be actively moved together with the movement of the compartment at the moving mount. As an example only, the moving mount may include a slanted element, such as a ramp, slope, spiral or slanted disc, which moves together with the compartment or an element of the moving mount. The second end of the second rocker may lie on the slanted element, so that the second rocker and, hence, the first rocker are rocking with the movement of the slanted element.

According to a second exemplary aspect to better understand the present disclosure, a monument for a passenger transport vehicle comprises a top section, and an oxygen container, according to the first aspect or at least one of its variants, arranged in the top section. Thus, the compartment of the oxygen container can be moved out of the monument towards the release position of the compartment from the top section of the monument. Since monuments can have an empty space in a top section, the oxygen container can be accommodated in a space usually available, so that other interior components of the aircraft can be designed without a mounting space for an oxygen container. For instance a ceiling panel can be designed differently, as it does not have to accommodate the oxygen masks.

In an implementation variant, the top section of the monument can include a cover and the oxygen container is arranged behind the cover in an interior space of the monument. For example, the oxygen container can be arranged directly behind the cover. Thus, when moving the compartment of the oxygen container into the release position, the compartment sticks out of the monument where the cover was.

The cover may be provided with predetermined breaking points, so that the compartment of the oxygen container can break through the cover when moving from the stowed position to the release position. Alternatively, the oxygen container can include a face plate arranged flush with the cover, when the compartment of the oxygen container is in the stowed position. The face plate can be attached to the compartment of the oxygen container, so that the face plate moves together with the compartment when leaving the stowed position and moving towards the release position.

According to a third exemplary aspect to better understand the present disclosure, a passenger vehicle section of a passenger vehicle comprises an aisle, a ceiling (or ceiling panel), and an oxygen container, according to the first aspect or at least one of its variants, arranged at the ceiling. In addition, the compartment of the oxygen container, when moving into the release position, can enter a top space of the aisle. In other words, the compartment of the oxygen container moves into the upper region of the aisle, where the oxygen masks can be reached or will fall out from the compartment into the aisle, where passengers and/or flight attendants may sit or operate.

In an implementation variant, the aisle can be a cross aisle extending substantially perpendicular to a longitudinal axis of the passenger vehicle. The longitudinal axis of the passenger vehicle is arranged in the driving or flight direction of the vehicle. The cross aisle can be an aisle, through which people can enter and leave the vehicle, for example, an aisle connecting a door of the vehicle and a center space or longitudinal aisle of the vehicle. The arrangement of an oxygen container with respect to such cross aisle allows provision of an oxygen mask in an area, where flight attendants usually operate or where flight attendant seats are located.

Alternatively, the aisle can be a longitudinal aisle extending along a longitudinal axis of the passenger vehicle. Such longitudinal aisle may run along a plurality of seat rows and allows passengers and/or flight attendants to reach the seats of the vehicle. An oxygen mask provided in this longitudinal aisle can easily be reached by passengers sitting at the aisle as well as flight attendants operating or sitting in this area of the vehicle.

In addition, the oxygen container is not required to be installed in a ceiling panel or lining forming the ceiling. Such conventional installation area for oxygen masks delimits the space in the aisle or above the ceiling panel and disrupts the ceiling panel. The oxygen container of the present disclosure makes such ceiling mounted oxygen masks superfluous and provides for a neat appearance of the aisle and ceiling.

In another implementation variant, the passenger vehicle section further comprises a monument, wherein the oxygen container is arranged in the monument. Thus, the monument delimits the aisle or is at least arranged at an upper section or top space of the aisle. Provision of an oxygen container in the monument, for example a top section of the monument, allows moving the compartment of the oxygen container into the release position, where the compartment is arranged in the upper section or top space of the aisle. Thus, the at least one oxygen mask will drop into the aisle.

In yet another implementation variant, the monument can be a monument according to the second aspect or at least one of its variants.

According to a fourth exemplary aspect to better understand the present disclosure, an aircraft comprises at least one oxygen container, according to the first aspect or at least one of its variants, and/or at least one monument, according to the second aspect or at least one of its variants, and/or at least one passenger vehicle section according to the third aspect or at least one of its variants.

The present disclosure is not restricted to the aspects and variants in the described form and order. Specifically, the description of aspects and variants is not to be understood as a specific limiting grouping of features. It is to be understood that the present disclosure also covers combinations of the aspects and variants not explicitly described. Thus, each variant or optional feature can be combined with any other aspect, variant, optional feature or even combinations thereof.

BRIEF DESCRIPTION OF THE DRAWINGS

Preferred embodiments of the invention are now explained in greater detail with reference to the enclosed schematic drawings, in which FIGS. 1a and 1b schematically illustrate a side view and plan view of a passenger vehicle section having an oxygen container.

DETAILED DESCRIPTION OF THE PREFERRED EMBODIMENTS

Figure 1A:
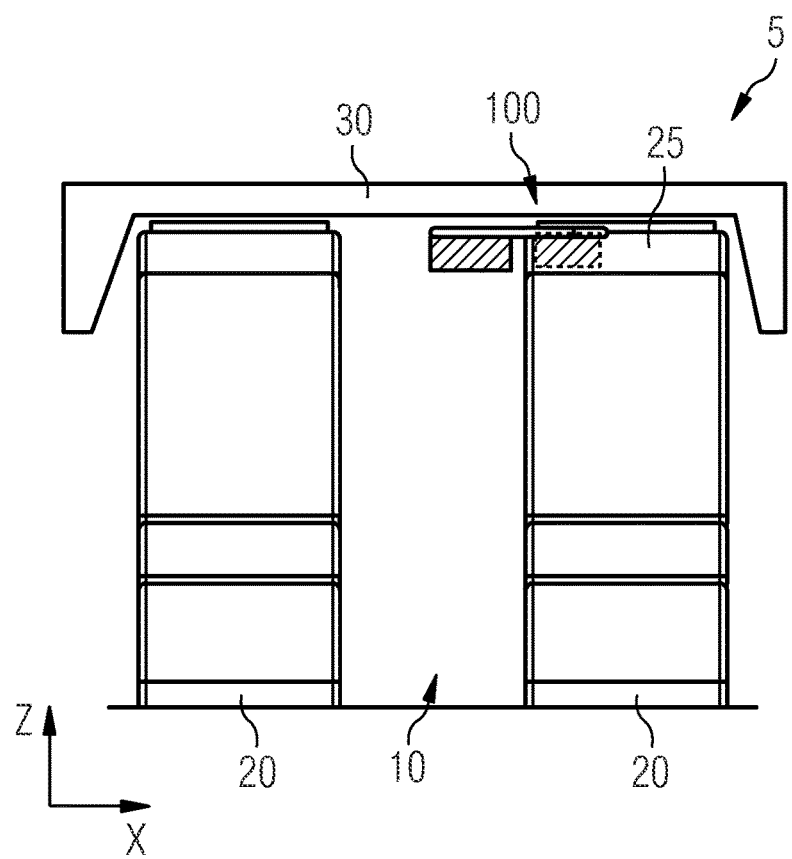
Figure 1B:
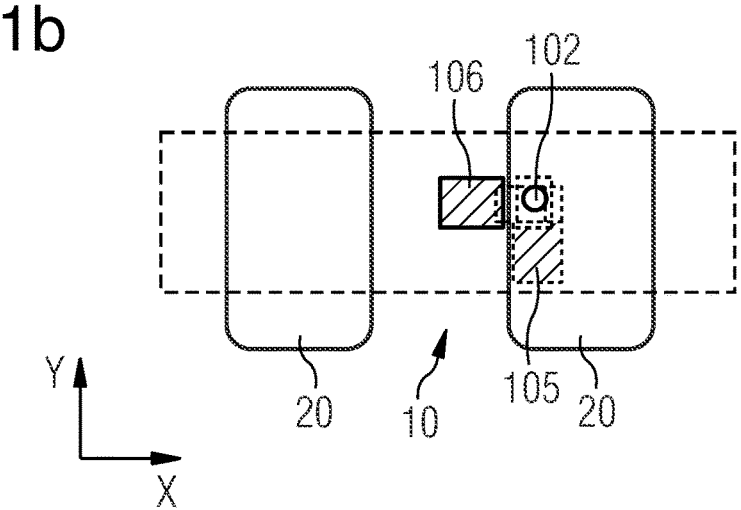

FIG. 1a schematically illustrates a side view, and FIG. 1b a plan view, of a passenger vehicle section 5 having an oxygen container 100. The exemplary passenger vehicle section 5 shows an aisle 10 that is delimited on both sides by a respective monument 20 and to the top by a ceiling panel 30. The illustrated aisle 10 can be a cross aisle that extends substantially perpendicular to a longitudinal direction (X axis) of a vehicle 1 (FIG. 7) including such passenger vehicle section 5, i.e., the aisle 10 extends along a cross-sectional direction (Y axis) of the vehicle 1. It is to be understood that the aisle 10 can also extend along the longitudinal direction of the vehicle 1. The monument 20 can be a galley, a lavatory, or a separation wall as well as an overhead stowage compartment.

The oxygen container 100 is arranged at the ceiling 30, so that it can enter an upper space of the aisle 10, i.e., right below the ceiling (panel) 30. For example, the oxygen container 100 can be arranged in a top section 25 of one of the monuments 20. It is to be understood that each monument 20 can include an oxygen container 100. The illustrated oxygen container 100 is drawn with dashed lines in a stowed position 105 and with solid lines in a release position 106. In the stowed position 105, the oxygen container 100 is fully contained inside of the monument 20 (e.g., when viewed in a plan view of the monument 20). In the release position 106, the oxygen container 100, or at least a compartment 101 (FIG. 4) thereof, can be arranged outside of the monument 20.

The oxygen container 100 comprises a compartment 101 configured hold at least one oxygen mask (not illustrated). Specifically, the compartment 101 can be sized so that a plurality of oxygen masks fit into an inner space of the compartment 101. The oxygen container 100 comprises a moving mount 102 coupled to the compartment 101 and configured to move the compartment 101 from the stowed position 105 to the release position 106. For instance, the moving mount 102 may be implemented as a swivel, hinge or pivot joint for a rotational or pivotal movement of the compartment 101, and/or can be implemented as a slide configured to linearly move the compartment 101 from the stowed position 105 to the release position 106.

Figure 2:
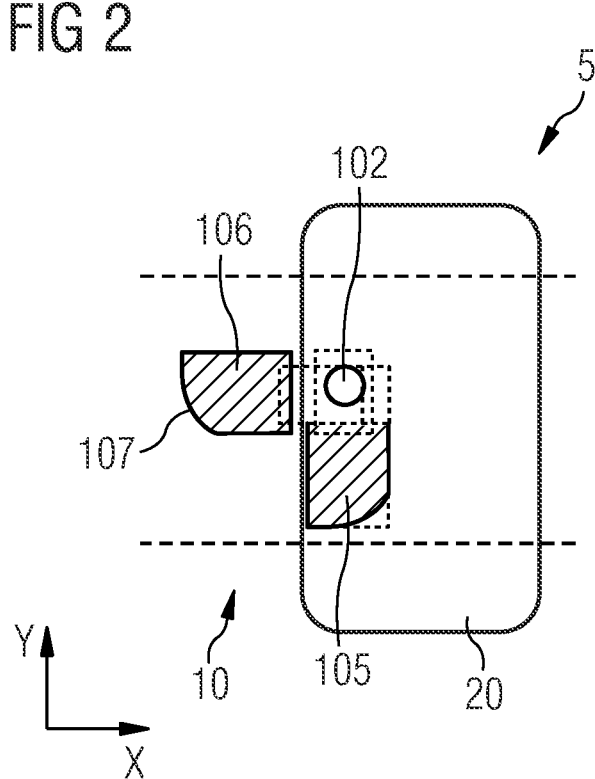
FIG. 2 schematically illustrates a plan view of a passenger vehicle section having a different oxygen container.

FIG. 2 schematically illustrates a plan view of a passenger vehicle section 5 having a different oxygen container 100. Particularly, the oxygen container 100 is differently formed than the container 100 illustrated in FIG. 1. Due to a pivotal movement of the compartment 101, an inner corner of the compartment 101 (right bottom corner of compartment 101 in stowed position 105 in FIG. 1) requires moving from inside the monument 20 into the aisle 10, so that an opening in the monument 20 has to be large enough for the corner to pass.

The compartment 101 illustrated in FIG. 2 has a round end face 107 at a side distant from the swivel 102. The round end face 107 may have a circular shape (in plan view) with a constant radius around the axis of rotation of the swivel 102. This allows reducing the size of the opening and the monument 20, since the round end face 107 fits through an opening in the monument 20 having approximately the same size as the compartment 101. Therefore, a gap between compartment 101 and the monument 20 can be kept to a minimum.

Figure 3:
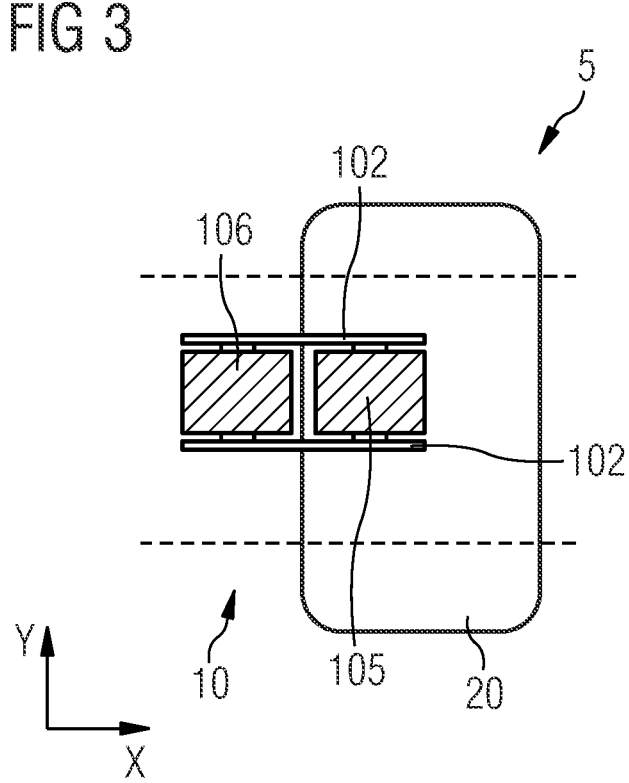
FIG. 3 schematically illustrates a plan view of a passenger vehicle section having a different oxygen container.

FIG. 3 schematically illustrates a plan view of a passenger vehicle section 5 having a different oxygen container 100. Particularly, the oxygen container 100 comprises a moving mount 102 configured to perform a linear movement of the compartment 101. For instance, at least one slide 102 is arranged on a side of the compartment 101, along which the compartment 101 can linearly move. Preferably, the slide 102 is a telescopic slide, so that the moving mount 102 is also inside of the monument 20 when the compartment 101 is in the stowed position 105. Of course, the movable mount 102 can be installed at a back side (right side in FIG. 3), so that the movable mount 102 can be substantially arranged inside of the monument 20, when the compartment 101 is in the stowed position 105 as well as the release position 106.

Figure 4:
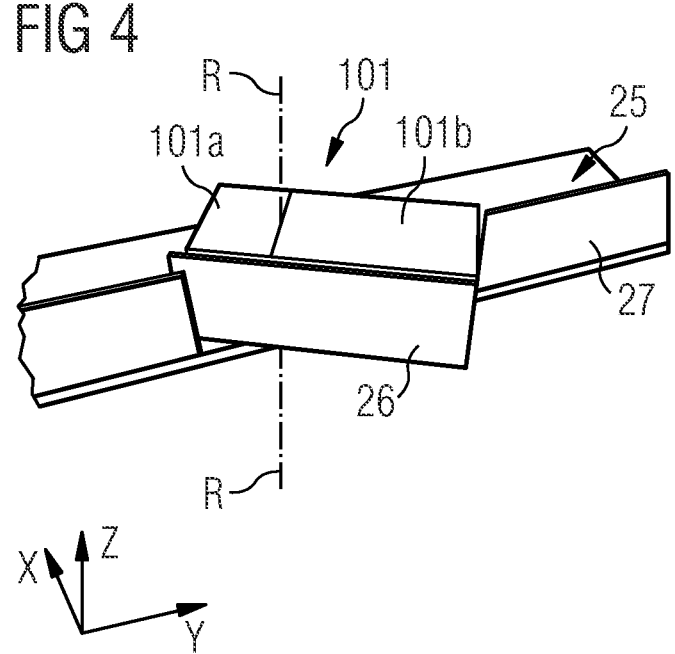
FIG. 4 schematically illustrates a perspective view of an exemplary oxygen container.

FIG. 4 schematically illustrates a perspective view of an oxygen container 100 with an axis of rotation R of the swivel 102 being exemplarily arranged in the compartment 101. Specifically, the rotation axis R of the swivel 102 runs through the compartment 101 dividing the compartment 101 in two portions 101a and 101b. This allows smaller gaps between a cover 27 of the monument 20 and a face plate 26 on the oxygen container 100 due to the smaller extent of the outwardly rotating part of the compartment 101.

For example, the oxygen masks can be arranged (hold) in only one portion 101b of the compartment 101. Correspondingly, a bottom lid 108 (explained in more detail with respect to FIGS. 5 and 6) may be dimensioned and arranged only at the bottom of this portion 101b. The other portion 101a will stay inside of the monument 20, so that its inner space cannot be brought to a position outside of the monument 20. Nevertheless, the other portion 101a can be used as installation space, for example, for an actuator of the swivel 102 and/or compartment 101, and/or for an oxygen tank and/or generator.

The face plate 26 can be provided on the oxygen container 100 in a manner, so that it is arranged flush with the cover 27 of the monument 20, when the compartment 101 is in the stowed position 105. The cover 27 of the monument 20 may be a lining closing the top section or space 25 of the monument 20 or any other part of the monument 20 in that region.

Figure 5:
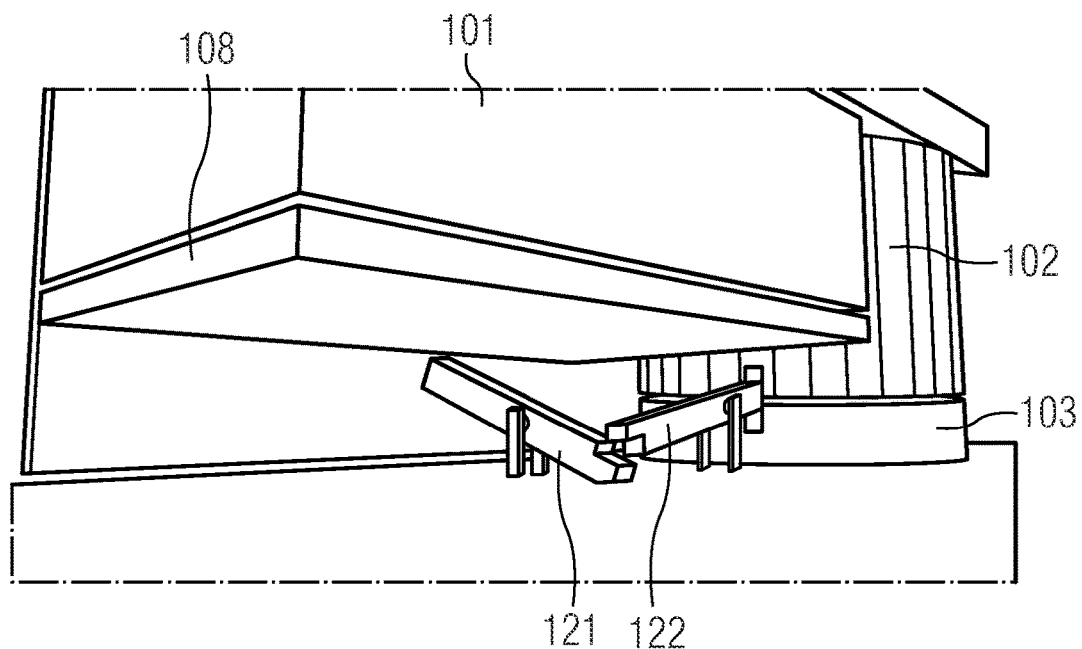
FIGS. 5 and 6 schematically illustrate perspective views of an oxygen container in different positions.
Figure 6:
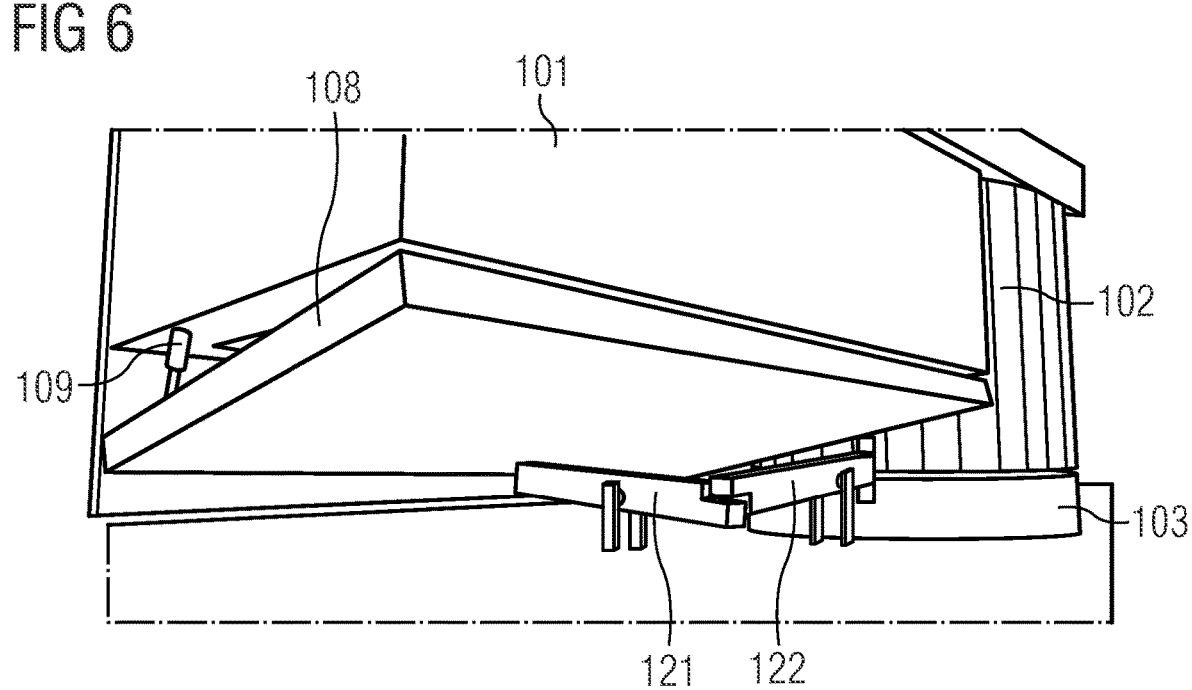

FIGS. 5 and 6 schematically illustrate perspective views of an oxygen container 100 in different positions. Particularly, FIGS. 5 and 6 illustrate the oxygen container 100 from a lower perspective showing a bottom lid 108. The bottom lid 108 can be hinged to the compartment 101 and can be configured to move between a closed position (FIG. 5) and an open position (FIG. 6 shows only a partially opened bottom lid 108). This opening movement of the bottom lid 108 can take place while the compartment 101 moves from the stowed position 105 to the release position 106. In other words, when the compartment 101 is in the stowed position 105, the oxygen masks inside compartment 101 are safely secured and stowed. Once the compartment 101 moves towards the release position 106, the bottom lid 108 opens and frees the oxygen masks.

The movement of the compartment 101 between stowed position 105 and release position 106 can be achieved by a first actuator 103 configured to act on the compartment 101 and/or the moving mount 102, which is illustrated in FIGS. 5 and 6 as a swivel 102. For example, the first actuator can be a spring, motor or other element acting on the moving mount 102 and/or compartment 101 to achieve a movement of the compartment 101 (in FIG. 5 a rotational/pivotal movement clockwise to the left).

A second actuator 109 may be provided with respect to the bottom lid 108. For instance, the second actuator 109 can be arranged inside the compartment 101 and/or inside a side wall of the compartment 101. Alternatively or additionally, the second actuator 109 may be integrated into a hinge coupling the bottom lid 108 to the compartment 101. The second actuator 109 can be a spring, a motor or other element acting on the bottom lid 108 in a way that the bottom lid 108 pivotally moves relative to the compartment 101 towards an open position. In the open position the bottom lid 108 may have turned about 60°, 90° or more, to fully open the opening in the compartment 101.

FIGS. 5 and 6 further illustrate a compartment release assembly 121, 122 configured to release the compartment 101 from the stowed position 105, when the bottom lid 108 moves to the open position. As an example only, the bottom lid 108 and/or the second actuator 109 can be triggered, so that the bottom lid 108 moves to the open position. The illustrated compartment release assembly comprises a first rocker 121 arranged to be contacted by the bottom lid 108, particularly during its movement from the closed position to the open position, at a first end of the first rocker 121 (to the left in FIG. 5). The bottom lid 108, thus, moves the first rocker 121. For example, bottom lid 108 may be locked in the closed position, for example, with a latch or the like (not illustrated) holding bottom lid 108 to compartment 101, which can be released by a trigger mechanism (not illustrated) and which can be a legacy trigger mechanism.

The compartment release assembly further comprises a second rocker 122 coupled to a second end of the first rocker 121 opposite to the first end and configured to release the compartment 101 from the stowed position. Specifically, the movement of the first rocker 121 induced by the bottom lid 108 is transferred to the second rocker 122, so that a second end of the second rocker 122 moves in the same direction as the first end of the first rocker 121. The second rocker 122, particularly its second end, can function as a latch or blocker with respect to the moving mount 102. Due to the movement induced by the bottom lid 108 and transferred via the first rocker 121, the second rocker 122 can be moved out of a blocking position, so that the moving mount 102 is free to move, for example, by the first actuator 103. This allows triggering the movement of the compartment 101 from the stowed position to the release position by the same trigger for opening the bottom lid 108, i.e., for releasing the oxygen masks.

Alternatively, the illustrated components can function as a lid release assembly 121, 122 configured to hold the bottom lid 108 in the closed position, when the compartment 101 is in the stowed position 105. In this case, the illustrated lid release assembly comprises a first rocker 121 contacting the bottom lid 108 at a first end of the first rocker 121 (the left end in FIGS. 5 and 6). The first rocker 121 can hold the bottom lid 108 in the closed position. Alternatively, bottom lid 108 may be locked in the closed position, for example, with a latch or the like (not illustrated) holding bottom lid 108 to compartment 101.

The further the compartment 101 moves towards the release position 106, the closer the first end of the first rocker 121 comes to the hinge of the bottom lid 108 and the compartment 101. Thus, a lever of the first rocker 121 acting against an opening force of the bottom lid 108 (e.g., induced by second actuator 109) decreases. Depending on the support of the first rocker 121, the opening force of bottom lid 108 may become stronger and the first rocker 121 is pushed away by bottom lid 108 allowing bottom lid 108 to open.

Only as an example, second rocker 122 of the lid release assembly may be coupled to a second end of the first rocker 121 (the right end in FIGS. 5 and 6) opposite to the first end. The second rocker 122 can be configured to support the first rocker 121 and holding the bottom lid 108. A second end of the second rocker 122 can be controllably moved (via a moving bearing or a motor or the like) or can be elastically supported (e.g., via a spring or the like). In case of an elastic support of the second rocker 122, the bottom lid 108 may push the first end of the first rocker 121 downwards, so that the second end of the second rocker 122 is also pushed downwards against a force of the elastic support. In case of a controllably moved support, the second end of the second rocker 122 may be brought into a position, so that the first end of the first rocker 121 gives way for the bottom lid 108.

In a mechanically simple solution, a spiral or slanted disc (not illustrated) may be arranged in or at swivel 102, on which the second end of the second rocker 122 lies. The spiral or slanted disc may be configured to rotate together with the compartment 101, so that a height of the second end of the second rocker 122 changes depending on the angle of rotation. Thus, while pivotally moving the compartment 101 from the stowed position 105 to the release position 106, the second end of the second rocker 122 and correspondingly the first end of the first rocker 121 can be moved downwards, allowing the bottom lid 108 to move from the closed position to the open position.

While FIGS. 5 and 6 illustrate the moving mount 102 as a swivel leading to a rotational movement of the compartment 101, it is to be understood that the compartment release mechanism as well as the lid release mechanism also functions with a moving mount 102 achieving a linear movement of the compartment 101.

Figure 7:
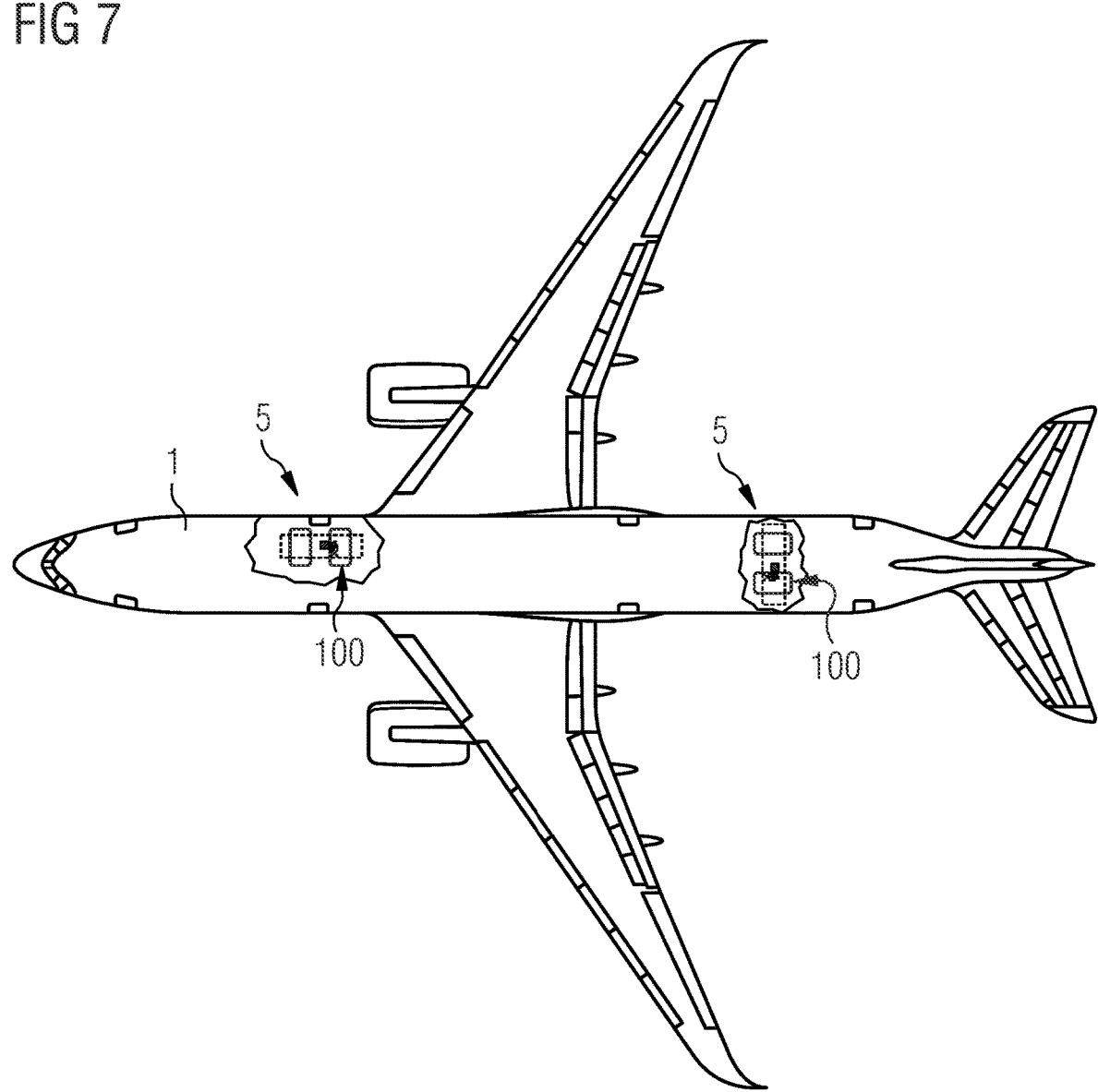
FIG. 7 schematically illustrates a vehicle.

FIG. 7 schematically illustrates a vehicle 1. The vehicle 1 as illustrated is an aircraft, where two portions of the outer skin are cut away and shows a respective passenger vehicle section 5. The vehicle 1 can comprise at least one oxygen container 100, at least one monument 20 and/or at least one passenger vehicle section 5. For instance, the aircraft 1 has eight doors, wherein each of the doors may be at the end of an aisle 10 along which at least one oxygen container 100 and/or at least one monument 20 with an oxygen container 100 is arranged. Alternatively or additionally, the aisle 10 may run along a longitudinal direction of the vehicle 1, and at least one monument 20 is arranged next to the aisle 10 (as illustrated to the right in FIG. 7).

The above description of the drawings is to be understood as providing only exemplary embodiments of the present invention and shall not limit the invention to these particular embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An oxygen container for a passenger transport vehicle, the container comprising:
   a compartment defining an inner space configured to hold at least one oxygen mask;

a moving mount coupled to the compartment and configured to move the inner space of the compartment from a stowed position to a release position; and a bottom lid hinged to the compartment and configured to move to an open position and releasing the at least one oxygen mask from the inner space of the compartment, when the inner space of the compartment moves from the stowed position to the release position.

2. The oxygen container according to claim 1, wherein the moving mount is a slide configured to linearly move the inner space of the compartment from the stowed position to the release position, or wherein the moving mount is a swivel configured to pivotally move the inner space of the compartment from the stowed position to the release position.

3. The oxygen container according to claim 2, wherein an axis of rotation of a swivel is located at one end of the compartment, or wherein an axis of rotation of the swivel runs through the compartment dividing the compartment in two portions, wherein, the bottom lid covers a space of the compartment corresponding to one of the two portions.

4. The oxygen container according to claim 2, wherein the compartment has a round end face at a side distant from a swivel, and wherein the round end face has a circular curvature with a radius from a rotation axis of the swivel.

5. The oxygen container according to claim 1, further comprising a first actuator configured to act on at least one of the compartment or the moving mount for moving the inner space of the compartment from the stowed position to the release position.

6. The oxygen container according to claim 1, further comprising a second actuator configured to act on at least one of the compartment or the bottom lid for moving the bottom lid to the open position.

7. The oxygen container according to claim 1, further comprising:

a compartment release assembly configured to release the compartment from the stowed position when the bottom lid moves to the open position, or a lid release assembly configured to hold the bottom lid in a closed position when the inner space of the compartment is in the stowed position, and to release the bottom lid towards the open position, when the inner space of the compartment moves to the release position.

8. The oxygen container according to claim 7, wherein the compartment release assembly comprises a first rocker arranged to be contacted by the bottom lid at a first end of the first rocker, when the bottom lid moves to the open position, and a second rocker coupled to a second end of the first rocker opposite to the first end and configured to release the inner space of the compartment from the stowed position.

9. A monument for a passenger transport vehicle, the monument comprising:

a top section; and an oxygen container according to claim 1 arranged in the top section.

10. The monument according to claim 9, wherein the top section includes a cover, and the oxygen container is arranged behind the cover in an interior space of the monument, and wherein, the oxygen container includes a face plate arranged flush with the cover, when the inner space of the compartment of the oxygen container is in the stowed position.

11. A passenger vehicle section for a passenger vehicle, the passenger vehicle section comprising:

an aisle;

a ceiling; and an oxygen container according to claim 1 arranged at the ceiling, wherein the inner space of the compartment of the oxygen container, when moving into the release position, enters a top space of the aisle.

12. The passenger vehicle section according to claim 11, wherein the aisle is a cross aisle extending substantially perpendicular to a longitudinal axis of the passenger vehicle, or wherein the aisle is a longitudinal aisle extending along the longitudinal axis of the passenger vehicle.

13. The passenger vehicle section according to claim 11, further comprising a monument, wherein the oxygen container is arranged in the monument.

14. The passenger vehicle section according to claim 13, wherein the monument comprises:

a top section; and an oxygen container for a passenger transport vehicle, the container comprising:

a compartment defining an inner space configured to hold at least one oxygen mask;

a moving mount coupled to the compartment and configured to move the inner space of the compartment from a stowed position to a release position; and a bottom lid hinged to the compartment and configured to move to an open position and releasing the at least one oxygen mask, when the inner space of the compartment moves from the stowed position to the release position arranged in the top section.

15. An aircraft comprising at least one oxygen container according to claim 1.

16. An aircraft comprising at least one monument according to claim 9.

17. An aircraft comprising at least one passenger vehicle section according to claim 11.

* * * * *